July 17, 1923.

J. J. HART 1,462,105

DEVICE FOR COOKING UTENSILS

Filed Oct. 14, 1921

WITNESS

INVENTOR.
JOHN J. HART.

BY

ATTORNEY.

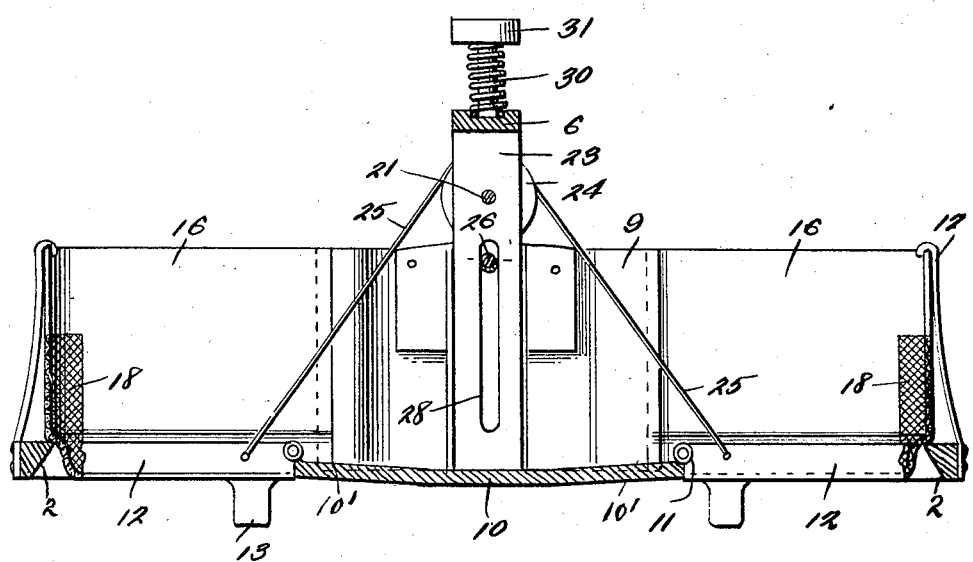

Patented July 17, 1923.

1,462,105

UNITED STATES PATENT OFFICE.

JOHN J. HART, OF OMAHA, NEBRASKA.

DEVICE FOR COOKING UTENSILS.

Application filed October 14, 1921. Serial No. 507,602.

*To all whom it may concern:*

Be it known that I, JOHN J. HART, a citizen of the United States, residing at Omaha, in the county of Douglas and State of Nebraska, have invented certain new and useful Improvements in Devices for Cooking Utensils, of which the following is a specification.

This invention relates to new and useful improvements in cooking utensils and more particularly to egg poachers.

The primary object of this invention is to provide a simple and inexpensive device which may be conveniently handled and which will properly discharge the poached eggs without breaking the yolk thereof.

Another object of the invention is to provide a device of the above nature which may be readily suspended in a receptacle containing boiling water so that the handle of the utensil will protrude beyond the re-receptacle and will not become heated to any great extent.

A further object of the invention is to provide a device of the above nature with which a plurality of eggs may be quickly poached and which embodies a pair of tilting receptacles which may be actuated to discharge poached eggs to the center of the utensil.

Other objects and advantages of the invention will become apparent during the course of the following description.

In the accompanying drawings forming a part of the specification and wherein like numerals are employed to designate like parts throughout the several views, Figure 1 is a perspective view of the utensil.

Figure 2 is a longitudinal section through the same,

Figure 3 is a transverse section through the utensil taken on the line 3—3 of Figure 2 showing the egg receptacle in normal position, and Figure 4 is a similar transverse section illustrating the egg receptacle in discharging position.

In the drawings wherein for the purpose of illustration is shown the preferred embodiment of the invention, the numeral 5 designates the handle of the utensil which may be formed of any suitable material such as insulation and has extended longitudinally thereof a shank 6 having a depending vertical portion 7 terminating in a head 8, opposite end edges of which are provided with concaved recesses as clearly shown in Figure 1. An arcuated plate 9 which forms a part of the side walls of an egg receptacle as will be presently described, is secured to each concaved end of the head 8, the upper edges of the plate 9 being flush with the head.

The egg receptacle support consists of a hinge plate 10, opposite ends of which are slightly inclined as at 10' from the horizontal as clearly seen in Figures 3 and 4 and are formed with apertured knuckles to cooperate with similar knuckles 11 which extend laterally from a pair of tilting egg receptacle supports 12. These receptacle supports 12 are arranged one on each side of the head of the handle and each comprises a ring like member having its portion adjacent the head 8 removed as clearly seen in Figure 1. One side of each support is equipped with a depending leg 13 for engagement with the bottom of the receptacle in which the poacher is suspended. It is to be understood that the receptacle supports 12 are not truely circular for opposite sides thereof extend inwardly of the true circle to form supporting ledges 14 for the flanges 15 formed at the bottom of the egg receptacles 16.

Each egg receptacle 16 is removable from its support, and a retainer clip 17 is secured to each support 12 and rises therefrom to overlap the upper edges of its recaptacle and to prevent the same from sliding when the egg receptacle is tilted to discharge the egg. Each egg receptacle 16 is circular, but a portion of the wall of each adjacent the head 8 of the handle is removed as seen in Figure 1, whereby the plates 9 of the handle may form closures for the egg receptacles when the latter are arranged in their normal position and whereby one end of each egg receptacle may be opened when tilted. As best seen in Figure 1 the plates 9 close the open ends of the egg receptacles when the latter are arranged in their normal portions and the edges of the plates 9 are disposed within the egg receptacles. It will be appreciated that a rather close fit between the receptacle and plate 9 is necessary to prevent the egg from seeping through. The end of each egg receptacle opposite its cutaway portion is provided with an enlarged opening which is covered with a straining medium 18 such as wire mesh whereby water in the egg receptacle may be drained prior to the discharging operation. Referring to Figure 3 of the drawings, it will be noted that the inside of each egg receptacle support 12 adjacent the strainer 18 is beveled outwardly and downwardly so as to effect quick drainage of the egg receptacles when desired.

In order to fasten the egg receptacle supports and hinge plate 10 to the handle 5, a standard 19 is bolted to the hinge plate 10 and to the underside of the shank 6 as clearly shown in Figure 2. The upper end of the standard follows along the shank 6 toward the handle from where it is bent downwardly and inwardly toward the standard to form a clip 20 for engagement with a receptacle in which the poacher is positioned. A bolt 21 is passed through the vertical portion 7 of the shank 6 and also through the standard 19, a nut 22 being threaded upon the bolt to prevent its displacement. This bolt also passes through a guide plate 23 which is arranged in a vertical position between the standard 19 and the vertical portion 7 of the shank 6. Opposite ends of this guide plate are angularly disposed and riveted both to the hinge plate 10 and the shank 6. A pair of pulley wheels 24 are rotatably mounted upon the bolt 21 between the guide plate 23 and the vertical portion 7 of the shank and are retained in spaced relation to one another and from the guide plate and portion 7 of the shank by suitable spacing collars. A flexible element such as a cable or chain 25 is passed around the pulley wheel 24 and the free ends of the table are fastened to the egg receptacle supports 12. The intermediate portion of the table is passed under the angularly disposed end 26 of a plunger 27 which is mounted through an opening in the shank 6. The angularly disposed end 26 of the plunger passes through a slot 28 in the guide plate 23 and the plunger 27 is equipped with a slot 29 through which the portion of the bolt 21 passes which is arranged between the guide 23 and standard 19. In order to maintain the plunger in a position to retain the egg receptacles in their normal position, a compression spring 30 is provided to encircle that portion of the plunger which passes through and extends above the shank of the handle. The upper end of the plunger is provided with a button 31 to form a convenient finger press for manipulating the plunger. The upper surface of the shank 6 is provided with a recess surrounding the opening through which the plunger passes to receive the bottom of the compression spring and prevent the same from slipping upon the shank. In operation, a pan filled with water is provided and placed over a fire to cause the water therein to boil. An egg is then freed from its shell and placed in each egg receptacle 16 after which the egg poacher is associated with the pan of boiling water so that a wall of the pan extends between the clip 20 and the standard 19 of the poacher, it being understood that the clip will frictionally engage the exterior of the pan and maintain the egg receptacles 16 within the pan of boiling water with the legs 13 of the egg receptacle supports resting upon the bottom of the pan. After the egg has been poached to the desired extent the poaching device is lifted from the pan by the handle 5 so that water which has entered the egg receptacles 16 will drain out through the strainers 18. A dish upon which the poached eggs are to be deposited is placed beneath the egg receptacles after which the plunger 27 is depressed thereby causing the lower angular end 26 to descend and force the intermediate portion of the cable 25 downwardly. This movement of the cable will cause rotation of the pulleys 24 and elevation of the ends of the cable and these ends being attached to the tilting egg receptacle supports 12, will cause them to tilt inwardly and downwardly whereby their bottoms will be inclined toward the center of the head 8 and be disposed below the lower edges of the closure plates 9. It will therefore be seen that the poached eggs will then be caused to slide from the egg receptacles and be deposited upon the dish positioned under the poacher. As soon as pressure on the plunger has been released, the coiled spring 30 will return the plunger to its normal position and automatically return the egg receptacles to their normal position to be closed by the closure plates 9 for the reception of other eggs to be poached. Referring to Figure 3, it will be seen that the bevelled inner edge 2 of each egg receptacle support 12 adjacent the strainer 18 will permit water in the egg receptacles to be quickly drained therefrom when the eggs have been properly cooked.

The foregoing description and accompanying drawings have reference to what might be considered to be the approved or preferred form of my invention. I desire it to be understood that I may make such changes in the construction, combination and arrangement of parts material, dimensions, etc. as may prove expedient and fall within the scope of the appended claims.

Having thus fully described my invention, what I claim as new and desire to secure by Letters Patent, is:

1. An egg poacher comprising a support, a pair of independent tiltable egg receptacles connected thereto and arranged opposite each other, and said receptacles mounted to tilt in opposite directions inwardly and downwardly whereby their bottoms are arranged in converging relationship when in a discharging position.

2. An egg poacher comprising a handle, support carried thereby, a tiltable egg receptacle detachably connected to said support and having an egg outlet, closure means carried by the handle for said outlet to normally close the same, and means associated with the handle for tilting the egg receptacle support whereby the egg receptacle may be moved relative to said closure means for permitting discharge of an egg through said outlet.

3. An egg poacher comprising a handle, an egg receptacle support movably associated therewith, said receptacle being provided with an outlet end, a closure plate carried by the handle and adapted to normally close said open end, and means for moving the receptacle relative to the closure plate for discharging an egg from said receptacle.

4. An egg poacher comprising a handle, a pulley associated therewith, a plunger associated with the handle, a tilting egg receptacle connected to said handle, a cable connected to said receptacle and plunger and passing over said pulley whereby the egg receptacle may be moved with respect to the handle by actuation of said plunger.

5. An egg poacher comprising a handle, a tiltable egg receptacle support associated with said handle, a standard connecting said support to said handle, a slotted guide plate connected to said handle and support, an axle journaled through said handle and standard and extending through said slotted guide, a pulley mounted upon said axle, a plunger mounted in said handle and having an angularly disposed portion projecting through said slotted guide, and a cable connected to said angular portion of the plunger and said support and extending over said pulley.

6. An egg poacher comprising a handle, a hinge plate connected thereto, a pair of egg receptacle supports pivotally connected to said hinge plate and adapted to be swung upwardly and inwardly of the poacher, an egg receptacle associated with each support and being equipped with an egg outlet, closure plates carried by the handle and adapted to normally close the egg outlet, and means associated with the handle for tilting the egg receptacle supports.

7. An egg poacher comprising a support, a receptacle tiltably connected thereto and having an opening in a side thereof through which an egg is discharged, means for tilting the receptacle, and means carried by the support for closing the opening when the receptacle is arranged in its normal position.

8. An egg poacher comprising a support, a receptacle tiltably connected thereto and having a portion of its side wall removed through which an egg is discharged, means for tilting the receptacle, and a closure plate carried by the support and conforming to the shape of the receptacle for closing the opening when the receptacle is arranged in its normal position.

9. An egg poacher comprising a support having an opening therein, an egg receptacle detachably mounted on the support with a portion arranged over said opening, and a resilient fastener secured to the support and adapted for engagement with the egg receptacle for detachably retaining the same attached to the support.

10. An egg poacher comprising a support having an opening therein, an egg receptacle detachably mounted on the support and having an apertured portion depending through said aperture.

11. An egg porcher comprising a support consisting of a ring having means for supporting the same in spaced relation to the bottom of a receptacle in which it is adapted to be placed, a detachable egg receptacle having its bottom fitting within the ring and equipped with a shoulder to rest upon the top edge of the ring, and said egg receptacle having apertures to permit water to pass in and out of the same.

12. An egg poacher comprising a handle, a hinge plate supported thereby below the same, an egg receptacle hinged to said hinge plate, and means carried by the handle for tilting the egg receptacle.

13. An egg poacher comprising a handle, a closure plate carried thereby, a tiltable egg receptacle carried by the closure plate, said receptacle having an open side, and its bottom extended therebeyond for engagement with the closure plate when the egg receptacle is arranged in its normal position, and means for tilting the receptacle.

14. An egg poacher comprising a handle, a closure plate carried below the same, a tiltable egg receptacle connected to the hinge plate, a standard fastened to said hinge plate and the handle for connecting the hinge plate thereto, the upper end of said upright being bent to provide a spring clip, an axle mounted in the upright and having a pulley wheel mounted thereon, and a plunger mounted in the handle, and a cable connecing the plunger and egg receptacle and adapted to be trained over said pulley.

In testimony whereof I affix my signature in presence of two witnesses.

JOHN J. HART.

Witnesses:
ERVIN M. DAVIDSON,
GRANT K. MORAN.